N. G. DE LANEY.
DISH WASHING MACHINE.
APPLICATION FILED JAN. 31, 1913.

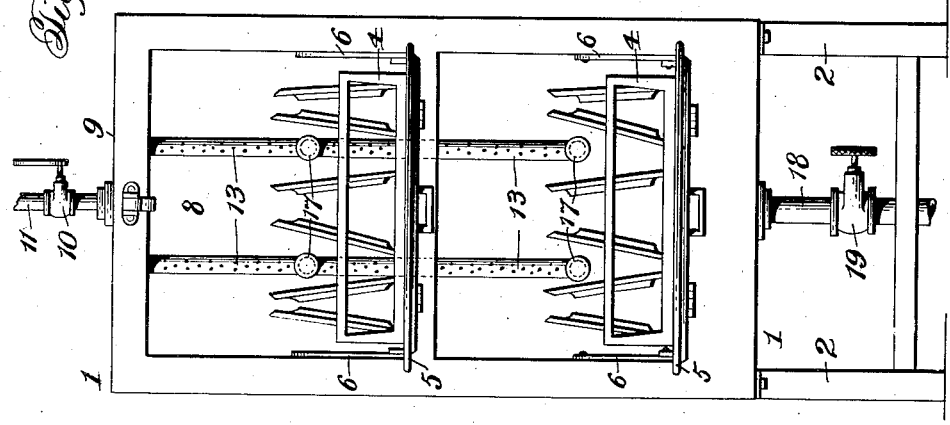
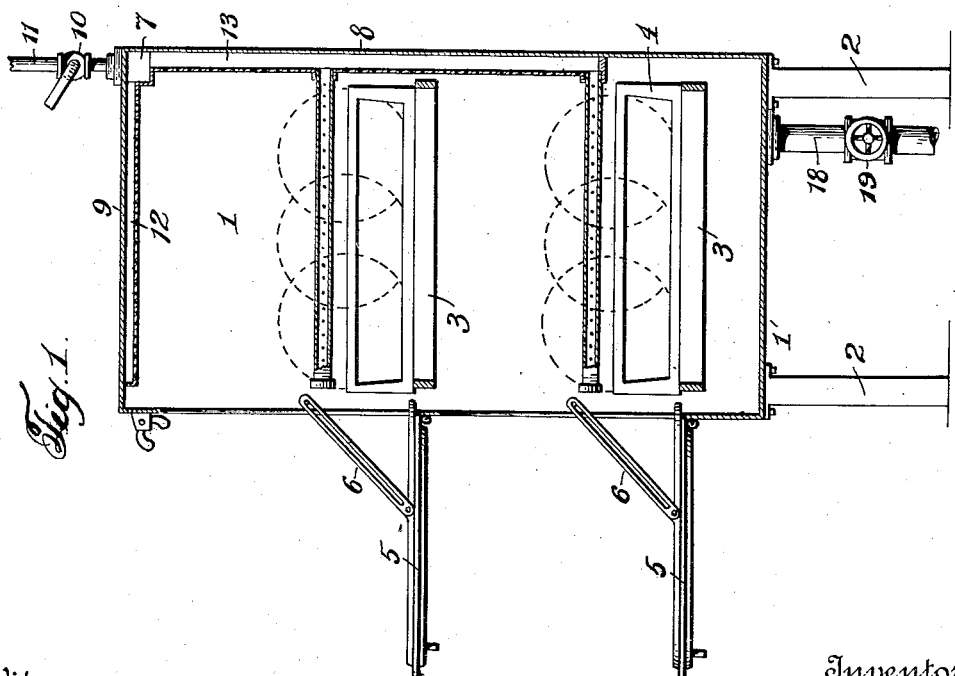

1,114,591.

Patented Oct. 20, 1914.
2 SHEETS—SHEET 2.

Witnesses:
Jas. E. Hutchinson
G. F. Downing

Inventor:
N. G. De Laney
By H. A. Seymour
Attorney

UNITED STATES PATENT OFFICE.

NELLIE G. DE LANEY, OF PORTERSVILLE, CALIFORNIA.

DISH-WASHING MACHINE.

1,114,591.  Specification of Letters Patent.  Patented Oct. 20, 1914.

Application filed January 31, 1913. Serial No. 745,399.

*To all whom it may concern:*

Be it known that I, NELLIE G. DE LANEY, of Portersville, in the county of Tulare and State of California, have invented certain new and useful Improvements in Dish-Washing Machines; and I do hereby declare the following to be a full, clear, and exact description of the invention, such as will enable others skilled in the art to which it appertains to make and use the same.

This invention relates to improvements in dish washing machines,—the object of the invention being to provide a machine of the character specified, which shall be simple in construction; cheap to manufacture and which shall operate to effectually and quickly cleanse dishes placed therein.

With this object in view, the invention consists in certain novel features of construction and combinations of parts as hereinafter set forth and pointed out in the claims.

Figure 3:
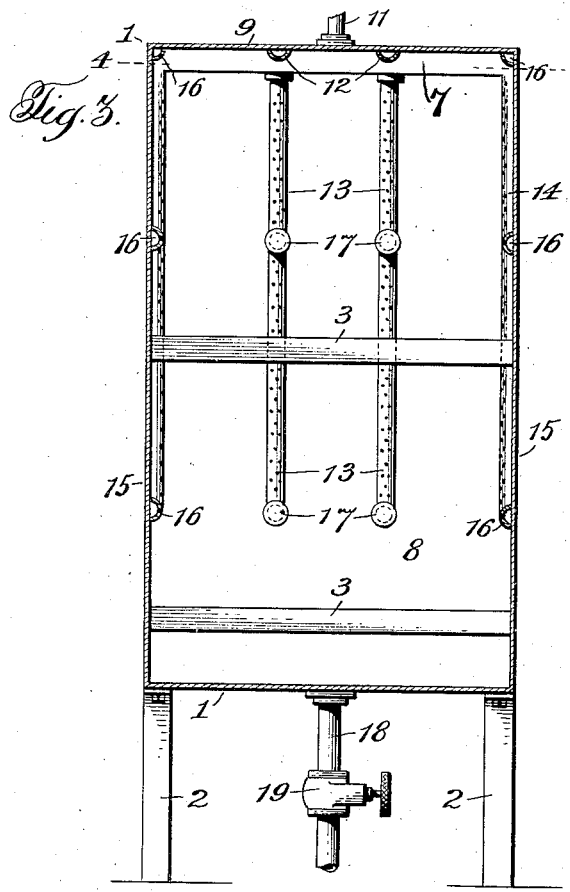
Figure 4:
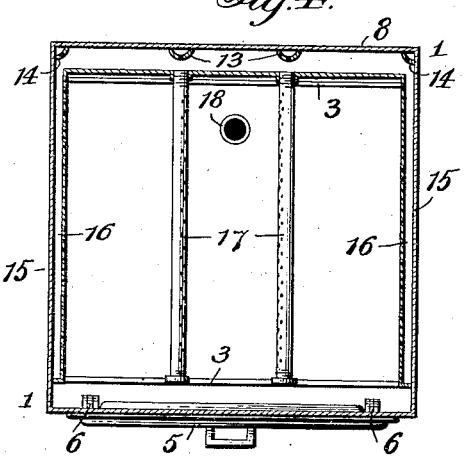

In the accompanying drawings, Figure 1 is a vertical sectional view of a dish-washing machine embodying my improvements; Fig. 2 is a front elevation with the doors open; Fig. 3 is a vertical transverse sectional view, and Fig. 4 is a horizontal sectional view on the line 4—4 of Fig. 3.

1 represents a rectangular casing which may be conveniently made of galvanized sheet metal, and is supported on legs 2 which may also be constructed of sheet metal and removably secured in position by means of suitable bolts.

Shelves 3 (preferably constructed of sheet metal channels) are located within the casing in superimposed relation, properly spaced apart, to receive racks 4 containing dishes to be washed. The shelves 3 thus divide the casing into superimposed communicating compartments suitably spaced apart. These compartments will be closed by drop doors 5 hinged at their lower edges and provided with brace arms 6. When these doors are open, as shown in the drawings, they form shelves which facilitate the insertion and withdrawal of the racks of dishes.

A channel 7 is located within the receptacle at the juncture of the back 8 with the top 9 thereof. This channel may be conveniently made of sheet metal and secured in place by soldering and forms a duct which receives water through a valved coupling 10 and a pipe 11 from a boiler or other source of supply. The wall of the channel or duct 7 is perforated to permit the discharge of water in jets onto the dishes. Channels 12 having perforated walls are also secured to the under face of the top 9 and communicate with the duct or channel 7 so as to receive water from the latter.

Vertical channels 13 (also constructed of sheet metal and perforated) are secured to the inner face of the back 8 of the casing and form ducts communicating with the duct or channel 7. Perforated channels 14 are vertically disposed and secured to the inner faces of the sides 15 and with these channels, horizontal perforated channels 16 secured to the inner faces of the sides 15, communicate.

The vertical channels 13 and 14 terminate at their lower ends in the lower chamber of the casing somewhat above the lower rack shelf as shown in Fig. 3. The channels 13 are provided at their lower ends and also at points above the plane of the upper rack shelf, with couplings for the reception of horizontal pipes 17 which project toward the front of the casing and their free ends are closed. These pipes are so disposed that they pass between dishes on the racks and are so perforated that water will be projected directly against the dishes.

An outlet pipe 18 communicates with the bottom of the casing and is provided with a valve 19, by means of which the rate of discharge of water from the machine may be regulated.

Various slight changes might be made in the details of construction of my invention without departing from the spirit thereof or limiting its scope and hence I do not wish to restrict myself to the precise details herein set forth.

Having fully described my invention what I claim as new and desire to secure by Letters-Patent, is:—

1. In a dish washing machine, the combination with a casing, and rack shelves therein, of perforated channels secured to the inner faces of the top, back and sides of the casing and coöperating with the same to form ducts communicating with each other, a valved water inlet for supplying water to said ducts, and a valved outlet communicating with the bottom of the casing.

2. In a dish washing machine, the combination with a sheet metal casing and means therein for supporting dishes, of a plurality of perforated sheet metal channels secured to the inner faces of the top, back and sides of the casing and coöperating with the same to form communicating ducts, a valved water inlet communicating with one of said ducts, and a valved water outlet communicating with the bottom of the casing.

3. In a dish washing machine, the combination with a casing and rack shelves therein, of vertical perforated channels secured to the inner face of the back of the casing and coöperating therewith to form ducts, horizontal perforated pipes, each communicating at one end with one of said vertical ducts and closed at the free end, said perforated pipes being disposed over the rack shelves so as to forcibly discharge water directly against the dishes held in racks on said shelves, means for supplying water to said ducts and means for discharging water from the casing.

4. In a dish washing machine, the combination of a sheet metal casing provided with door openings, a plurality of perforated channels secured to the walls of the casing and coöperating therewith to form ducts communicating with each other, means for supplying water to said ducts, dish supporting means within the casing in line with each of the door openings, perforated pipes over said supporting means and communicating with certain of said ducts, and means for controlling the discharge of water from the casing.

In testimony whereof, I have signed this specification in the presence of two subscribing witnesses.

NELLIE G. DE LANEY.

Witnesses:
J. P. HOLDEN,
J. E. ZIMMERMAN.